A. FANDREY.
PROCESS OF MAKING IMITATION ART GLASS.
APPLICATION FILED JUNE 21, 1909.
951,879.
Patented Mar. 15, 1910.
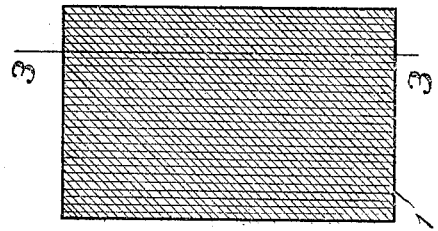
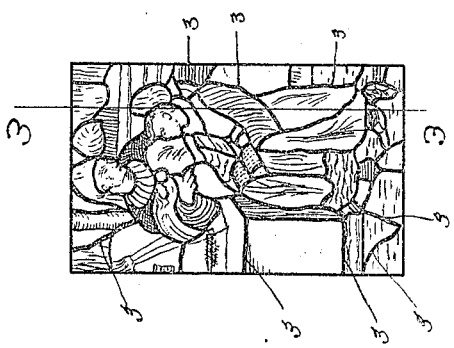
WITNESSES:
Francis M. Springer
Cornelia Luesche
INVENTOR
Albert Fandrey
BY
Thompson Bell
ATTORNEY

UNITED STATES PATENT OFFICE.

ALBERT FANDREY, OF INDIANAPOLIS, INDIANA.

PROCESS OF MAKING IMITATION ART-GLASS.

951,879.  Specification of Letters Patent.  Patented Mar. 15, 1910.

Application filed June 21, 1909. Serial No. 503,501.

*To all whom it may concern:*

Be it known that I, ALBERT FANDREY, subject of William II of Germany, and residing at Indianapolis, in the county of Marion and State of Indiana, have invented certain new and useful Improvements in Processes of Making Imitation Art-Glass, of which the following is a specification, reference being had therein to the accompanying drawing.

This invention relates to an improved method of imitating art glass as hereinafter described in this specification and particularly pointed out in the claim.

The object of this invention is to provide a new method of portraying or drawing in color paintings of landscapes or portrait on glass to resemble those represented on art glass and present, when finished, every appearance of work of the character executed on art glass both as to transparency and execution. I attain this object by the process illustrated in the accompanying drawing in which like numerals of reference designate like parts.

Figure 1 is a view of a plate of glass; Fig. 2 is a similar view of the same showing the linen mounted on the same and the picture or figure drawn or painted on the glass to represent stained art glass; and Fig. 3 is a section taken along the lines 3—3 in Figs. 1 and 2.

I first select a piece of clear glass 1 which may be double strength glass and thoroughly clean the surface of the same to remove all spots or grease. I then place the plate thus prepared flatwise on a suitable table. I then take a piece of linen or other suitable fine fabric 2, cut it to the size of the glass and stretch and lay it flatwise on the glass 1. I next take a good grade of transparent varnish and apply it by a brush in the usual way to the linen or fabric 2 on the glass until the entire surface of the linen is thoroughly coated and the varnish has penetrated the linen to the surface of the glass and then lay the glass with its linen covering to one side to dry, which requires about twenty-four hours, and when the varnish has dried the linen will adhere to the surface of the glass. I then apply a second coat of transparent varnish to the fabric to render it more transparent and lay the plate thus prepared to one side to dry as before.

I next outline the picture or design on the linen secured to said glass either by laying said glass and linen, with the linen side up, on the drawing or design, to be copied, and drawing the outline with a pencil or crayon, following the lines as seen through the transparent linen, or by stenciling the drawing or design through a prepared stencil. I then paint, free hand, the design or picture with transparent colors on said prepared linen. I then paint lines 3 on the picture or drawing, traced on the linen backing, with gold, silver or aluminium &c. bronze paints to represent the desired finish of the lead divisions. I finally apply one or more coats of transparent varnish to the finished painting to render the whole more transparent and fix the lines on the linen or fine fabric.

I claim:—

The process of making imitation art glass which consists in cementing and rendering transparent a sheet of linen or other fine fabric to one side of a sheet of glass with transparent varnish, then executing, with free hand, a picture or design on said linen in transparent colors and painting the lines 3 with gold, silver, or aluminium, bronze paints to represent the desired finish of the leaded sections and finally covering the whole with transparent varnish, substantially as described.

In testimony whereof I affix my signature in presence of two witnesses.

ALBERT FANDREY.

Witnesses:
THOMPSON R. BELL,
FRANCIS M. SPRINGER.